UNITED STATES PATENT OFFICE.

NAHUM E. KATZ, OF MERIDIAN, MISSISSIPPI.

PROCESS OF MAKING VISCOSE.

1,251,237. Specification of Letters Patent. Patented Dec. 25, 1917.

No Drawing. Application filed August 28, 1917. Serial No. 188,682.

*To all whom it may concern:*

Be it known that I, NAHUM E. KATZ, a citizen of the United States, residing at Meridian, in the county of Lauderdale and State of Mississippi, have invented certain new and useful Improvements in Processes of Making Viscose, of which the following is a specification.

This invention relates to a novel process of preparing viscose and similar compositions. The principal objects of the invention are to provide a simplified and economical process of preparing compositions containing cellulose xanthate (viscose), while avoiding the usual evolution of the noxious and inflammable carbon disulfid. The product resulting from my improved process has a greater degree of pliability than the hard, horny and rather brittle viscose as commonly prepared; and owing to this circumstance, as well as to its stretching qualities, it is apt to find a considerably wider field of use in the arts.

The usual method of preparing viscose for utilization in the manufacture of films, filaments, sheets, artificial leather and the like, comprises subjecting a cellulosic material such as wood pulp, cotton or the like to the action of an excess of caustic soda for a suitable length of time, as a result of which a mixture is formed containing alkali cellulose suspended in or permeated by an excess of caustic soda. The excess of caustic soda solution is then removed from the alkali cellulose by squeezing, pressing, centrifugal action or other appropriate method. The alkali cellulose is then charged into a closed vessel provided with stirring means, and is there subjected for a suitable period to the action of carbon disulfid, being changed thereby into cellulose xanthate. This cellulose xanthate is then dissolved in a suitable quantity of water, caustic alkali or similar solution, and the resulting viscous or gelatinous liquid is commonly known as viscose. Upon being set, coagulated or precipitated by methods well understood in the art, this liquid yields a product which for most purposes is too hard, horny and brittle. To render the viscose more pliable it must be mixed with various softening agents, such as glycerin, oil and the like. Owing, however, to the great viscidity of the viscose it is difficult to prepare in this way an intimately mixed product; and the operation furthermore requires strongly built machinery and the expenditure of considerable power.

Throughout the above process, in all its stages, there is an evolution of the noxious and inflammable vapors of carbon disulfid, necessitating the provision of special means for preventing its escape.

My improved process obviates the necessity of removing the excess of alkali from the alkali cellulose as first prepared, and the special treatment of the xanthate to insure pliability of the product; and avoids the evolution and loss of carbon disulfid.

My invention may be carried out as follows:—

I prepare the alkali cellulose in the usual manner, and then without removing the excess of alkali I react upon the alkali cellulose with a suitable quantity of carbon disulfid to which I have previously added a suitable quantity of an appropriate plasticizing ingredient, which may be a fatty acid, fat oil, or wax of either vegetable, animal or mineral origin; or rosin or a resin-like substance; or glycerin, sugar, starch, potato flour, dextrin, rubber, balata, gutta percha; or gums, such as dammar or the like; or tar, asphalt, or similar products; either singly or in the form of a composition comprising two or more of the above-mentioned materials dissolved in an appropriate solvent, such as carbon tetrachlorid, benzene, benzin, turpentine, alcohol or the like. In some cases, however, these plasticizing ingredients may be added directly to or dissolved in the carbon disulfid, without being previously dissolved in such solvents as those mentioned above.

The choice of the materials mentioned above is of course to be governed by the particular application for which the viscose is intended. The improved viscose may then be set, coagulated, precipitated or refined by any of the well known methods, as by dry or steam heat, by weak acids, by salt solutions, etc. It may be employed in the manufacture of various plastics, for the production of filaments or threads, for waterproofing or sizing, for impregnating canvas, felt, and other fabrics and fibrous materials, for the manufacture of artificial leather, and for a wide variety of other purposes.

The following is a specific illustrative example of my process. I wish it to be understood, however, that my invention is not limited to the precise quantities, proportions, materials, or manipulations mentioned therein, as it is evident that my process admits of variations within wide limits in order that it may be adapted to particular applications of the product.

For producing an artificial leather using viscose as a coating material, I prefer to proceed as follows:—

I place about one hundred pounds of cotton in a rotating vessel, and then add about two hundred fifty pounds of a caustic soda solution of 30° to 32° Baumé. Upon completion of the reaction with formation of alkali cellulose, I immediately add about fifty pounds of carbon disulfid which has previously been mixed with twenty to twenty-five pounds of oleic acid, or some oil such as castor oil or linseed oil, dissolved in five pounds of carbon tetrachlorid. During the addition of this mixture and afterward throughout the period of reaction, the contents of the vessel are thoroughly agitated. After completion of the xanthizing reaction I add to the contents of the vessel sufficient water to form a twenty per cent. solution. With this solution I then impregnate a suitable material, such as cotton duck or drill, taffeta, burlap or other fabric. I then squeeze out the surplus viscose by gentle pressure, and fix the cellulose by steaming or heating. Lastly, I wash the impregnated fabric to remove the excess of alkali and salts, and subject it to the usual operations of drying, calendering, and embossing with a suitable pattern.

I claim:—

1. The process of producing a composition containing viscose, which consists in preparing an alkali cellulose containing an excess of alkali, and reacting directly thereon with carbon disulfid associated with an organic plasticizing ingredient.

2. The process of producing a composition containing viscose, which consists in preparing an alkali cellulose containing an excess of alkali, and reacting directly thereon with carbon disulfid associated with an organic plasticizing ingredient and a solvent for said plasticizing ingredient.

N. E. KATZ.

Witnesses:
R. P. OSLER,
I. A. ROSENBAUM.